United States Patent [19]

Kidd

[11] 3,963,274

[45] June 15, 1976

[54] TIP-UP FLOORS OF TRANSPORT VEHICLES

[76] Inventor: Archibald Watson Kidd, Seend Close, Seend, Melksham, Wiltshire, England

[22] Filed: Nov. 8, 1974

[21] Appl. No.: 522,218

[52] U.S. Cl. .......................... 298/22 R; 214/130 R
[51] Int. Cl.² .......................................... B60P 1/16
[58] Field of Search ............... 298/1 R, 22 R, 22 C, 298/22 P, 22 D, 22 A; 214/130 R, 1 Q, 77 R

[56] References Cited
UNITED STATES PATENTS 616,071   12/1898   Bennett ............................ 298/22 R
1,680,834   8/1928   Wood ............................... 298/22 A

FOREIGN PATENTS OR APPLICATIONS 1,041,609   10/1953   France ............................. 298/22 C

*Primary Examiner*—Frank E. Werner
*Attorney, Agent, or Firm*—Larson, Taylor & Hinds

[57] ABSTRACT

A tipping floor for a farm trailer or like vehicle. The floor is supported from and is fast with a cylindrical transverse horizontal member at the rear of the floor. The horizontal member is rotated to tip the floor, which can be tipped to an almost vertical position.

7 Claims, 2 Drawing Figures

U.S. Patent June 15, 1976 3,963,274
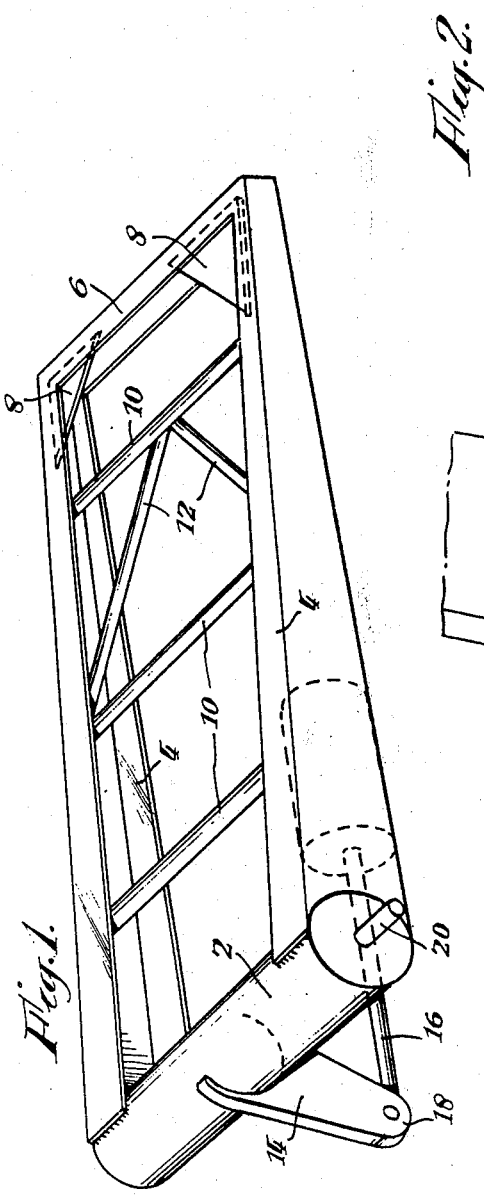
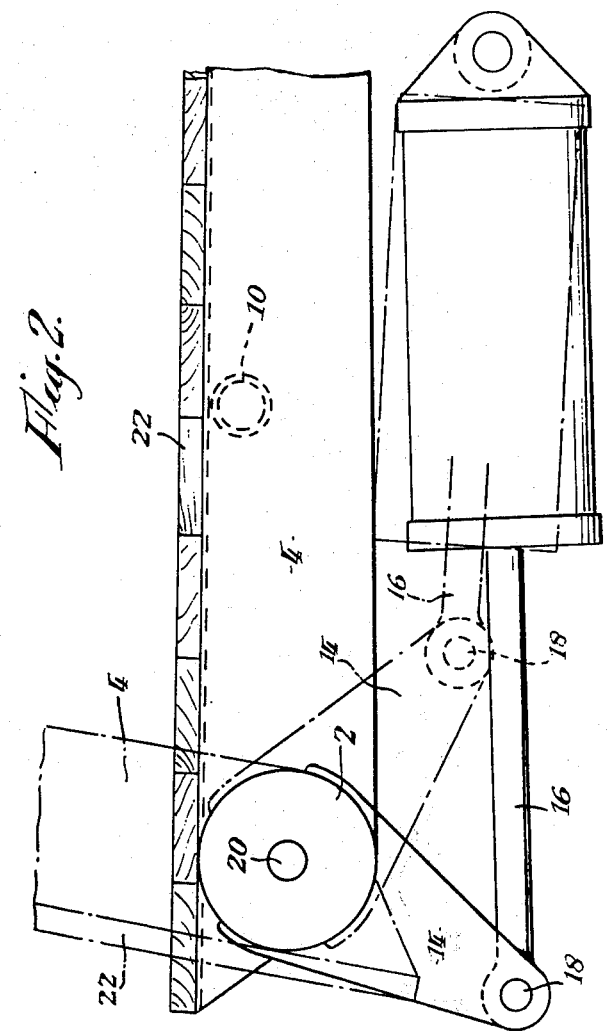

TIP-UP FLOORS OF TRANSPORT VEHICLES

This invention relates to tip-up floors of transport vehicles, i.e. trucks, trailers or the like.

Trailers, such as are used by builders, contractors and more particularly by farmers, behind ordinary agricultural tractors are generally sold as being able to carry loads of two tons up to eight tons or even more. Most of these trailers have two wheels or alternatively tandem wheel sets set near the back and the chassis is arranged so that the portion carrying the body or deck is hinged at the rear and is arranged to tip by means of a centrally positioned hydraulic ram. Such trailers are normally provided with sides and a hinged tail-end door and additionally they can be fitted with extension sides up to seven or eight feet high for use when harvesting forage crops.

A common failing in farm trailers is that they do not tip to steep enough an angle for sticky loads to slide out freely. In some cases wet forage will not easily discharge nor will muddy earth and the like such as occurs when cleaning out ditches in the winter time. In fact few trailers tip to a higher angle than 70° aboce the horizontal while many achieve less than this. A further disadvantage of trailers as now commonly provided is that they twist when tipping unless the load is fairly symmetrically placed. In other words the part of the chassis which carries the load and which is hinged at the back has insufficient torsional strength to tip evenly and without distortion if the load should happen to be lop-sided as is more frequently the case when dealing with solid materials rather than with forage. The invention can also be applied to tip-up floor or self-powered trucks.

This invention has for its object to provide an improved tipping system for agricultural trailers, trailer bodies for trucks, contractor's trailers, self-powered trucks and the like.

The invention also has for another object a tipping system for transport vehicles which will tip through at least 80°.

According to this invention we provide a tip-up floor of a trailer or the like comprising a transverse horizontal member rotatable on its own axis, said member being fast with the floor at or near the rear thereof means being provided for rotating the member whereby the floor can be cantilevered into a nearly vertical position by the rotation of the member.

In one way of carrying this invention into practice the deck of a trailer, i.e. the part which tips is constructed basically of a transverse tubular member at the rear and a pair of cantilever forwardly facing side arms which are rigidly secured to the respective end portions of the tubular member. The side arms may be of fairly light gauge metal seeing that a considerable depth can be employed in order to accommodate the somewhat substantial bending moment which they will have to carry during tipping.

Further details of one form of trailer made according to this invention is illustrated in the accompanying drawing wherein:

FIG. 1 is a perspective view of the tip-up floor of the trailer with the decking removed, and FIG. 2 is a side elevation of the tipping mechanism.

Referring to the drawing the frame of the floor is shown in FIG. 1. This comprises a rotatable transverse tubular member 2 at the rear of the trailer and a pair of cantilever arms 4 fast with the tubular member 2 and extending forwardly therefrom. The arms may be of channel or box section and are braced together at their ends by a section rail 6 and gussets 8 and braced along their lengths by smaller diameter tubular bars 10 and diagonal members 12. Approximately at the centre of the transverse tubular member 2 is fixed a substantial crank bracket 14 to which is attached a large diameter hydraulic ram 16. In one arrangement (that shown) the ram 16 is made to pull on the bottom 18 of crank bracket 14 but designs are possible in which a pushing arrangement can be adopted. The tubular member 2 has shaft projections 20 at its ends carried in suitable bearings mounted on the underframe or chassis of the trailer (not shown). Similarly the pivotal support for the hydraulic ram 16 is carried from the under-chassis of the trailer.

Referring to FIG. 2, the tipping mechanism is shown in greater detail. When the floor with its deck 22 is in the horizontal position, the bracket 14 is in the position shown in full lines. When the ram 16 operates, the transverse tubular member 2 is caused to rotate on its own axis through say 80° or even 85° thus carrying up the side arms 4 and associated structure into the position shown in chain dotted lines in FIG. 2.

By arrangement described above not only can a high tipping angle be achieved by means of a single ram but also a torsionally stiff deck structure can easily be achieved so that should the load be unequal about the fore and aft centre line of the trailer deck no noticeable amount of twisting and distortion will occur.

An advantage arising from this construction is that by suitably arranging the geometry of the actuating ram and the crank, practically maximum tipping torque can be imposed at the beginning of the stroke when the need is greatest, and when the deck is nearing its maximum position the tipping torque will be much reduced which at that state of the proceeding does not matter. This is in contradistinction to the normal method of a triplex or three stroke ram used on conventional tipping trailers.

The chassis under-frame of the trailer need not contain any remarkable features. For example it can comprise a sngle "A" frame with adequate sized wheels mounted on stub-axles fairly near the rear end. There mat be a front bolster to take the weight of the front of the deck when it is in its lowered position. Over-run brakes can be provided together with parking facilities on the brakes.

The construction can give rise to a very light trailer overall with maximum stiffness including torsional stiffness against lop-sided loads.

I claim:

1. In a trailer, a tip-up floor assembly comprising a floor, a transverse horizontal tubular member located at the rear of said floor, said tubular member being rotatable about a longitudinal axis of rotation, normally generally horizontal arms supporting said floor, said arms being fixed at one of their ends to the tubular member to move therewith upon rotation thereof and having their upper and lower surfaces extending forwardly on respective lines spaced above and below the axis of the tubular member, a normally generally vertically oriented crank bracket, and a single acting ram coupled to said crank bracket to operate it, the upper end portion of said bracket embracing and being fixed to the tubular member and the lower end portion of the bracket being movable forwardly and backwardly by said ram, whereby the floor can be pivoted from a horizontal position to tip up the floor, with the floor being cantilevered outwardly from said tubular member, said bracket and said ram being so oriented as to impose substantially maximum torque on said tubular member during the first part of the tipping movement from horizontal and subsequent diminishing torque as said floor and arms move toward the vertical position.

2. Apparatus as claimed in claim 1 wherein at least the upper surfaces of said arms extend tangentially from the upper surface of said tubular member.

3. Apparatus as claimed in claim 1 wherein the force axis of said ram is substantially horizontal when the floor is in its horizontal position.

4. Apparatus as claimed in claim 3 wherein said arms are fixed to the end portions of said tubular member, and said crank bracket is fixed to a generally central portion of said tubular member.

5. Apparatus as claimed in claim 4 wherein said ram and said crank bracket are so constructed and arranged that when said ram travels through its maximum travel said tubular member is pivoted through at least 80°, with corresponding movement of said floor.

6. Apparatus as claimed in claim 1 wherein the upper and lower surfaces of said arms extend tangentially from the upper and lower surfaces, respectively, of said tubular member.

7. Apparatus as claimed in claim 1 wherein said ram is located beneath said floor and forward of said tubular member.

* * * * *